US008899296B2

(12) United States Patent  
Sotgiu

(10) Patent No.: US 8,899,296 B2  
(45) Date of Patent: Dec. 2, 2014

(54) APPARATUS FOR SERVICING VEHICLE WHEELS

(71) Applicant: Snap-On Equipment Srl a Unico Socio, Correggio (RE) (IT)

(72) Inventor: Paolo Sotgiu, Modena (IT)

(73) Assignee: Snap-On Equipment Srl a Unico Socio, Correggio (IT)

( * ) Notice: Subject to any disclaimer, the term of this patent is extended or adjusted under 35 U.S.C. 154(b) by 253 days.

(21) Appl. No.: 13/626,724

(22) Filed: Sep. 25, 2012

(65) Prior Publication Data

US 2014/0083625 A1    Mar. 27, 2014

(51) Int. Cl.  
*B60C 25/132*    (2006.01)  
*B60C 25/01*    (2006.01)

(52) U.S. Cl.  
CPC ...................................... *B60C 25/01* (2013.01)  
USPC ............................ 157/1.17; 157/1.24; 73/462

(58) Field of Classification Search  
USPC ........................... 157/1.17–1.28; 73/460–467  
See application file for complete search history.

(56) References Cited

U.S. PATENT DOCUMENTS

| 4,905,515 | A | | 3/1990 | Himmler |
| 5,385,045 | A | | 1/1995 | Mannen et al. |
| 5,600,062 | A | * | 2/1997 | Moench ......................... 73/462 |
| 6,854,329 | B2 | * | 2/2005 | Colarelli et al. ................. 73/462 |
| 8,250,915 | B1 | * | 8/2012 | Voeller et al. .................... 73/460 |
| 8,613,303 | B1 | * | 12/2013 | Hanneken et al. ........... 157/1.17 |
| 2012/0073764 | A1 | * | 3/2012 | Lawson et al. ................. 157/1.1 |

FOREIGN PATENT DOCUMENTS

| DE | 37 16 210 A1 | 12/1988 |
| DE | 43 42 667 A1 | 6/1995 |
| DE | 10 2004 056367 A1 | 5/2006 |

OTHER PUBLICATIONS

Search Report issued in European Patent Application No. 12185892.2 dated Feb. 18, 2013.

* cited by examiner

*Primary Examiner* — David B Thomas  
(74) *Attorney, Agent, or Firm* — McDermott Will & Emery LLP

(57) ABSTRACT

Apparatus including a wheel balancing device and a tire changing device, comprising a spindle shaft for rotatably supporting a vehicle wheel or rim, unbalance measuring means operatively connected to the spindle shaft and having a spatial unbalance measuring area in which unbalance forces of the wheel or rim are detected, tire changer tools for assembling a tire onto a rim, spindle supporting means supporting the spindle shaft in a force acting range in which forces are created between the tire changer tools and the tire during the assembling or disassembling of the tire, tool supporting means supporting the tire changer tools within the force acting range which is arranged outside of the spatial unbalance measuring area, and drive means driving the spindle shaft with a rotational speed and torque adapted for assembling and disassembling the tire or for measuring unbalance forces of the wheel or rim.

11 Claims, 11 Drawing Sheets

APPARATUS FOR SERVICING VEHICLE WHEELS

BACKGROUND OF THE INVENTION

The invention concerns an apparatus for servicing vehicle wheels including a wheel balancing device and a tire changing device.

Such an apparatus is known from U.S. Pat. No. 5,385,045. The known apparatus has a spindle shaft which is used to assemble and disassemble a tire by means of tire changer tools and to measure forces created by an unbalance of the vehicle wheel. The unbalance measuring means include force transducers which are operatively connected to the spindle shaft. The vehicle wheel is driven by hand or by an additional motor, for instance by a frictional motor. During the assembling of the tire to the wheel rim and the disassembling of the tire from the wheel rim, strong forces are applied to the tire and the wheel rim which are mounted on the spindle shaft. The transducers which measure the forces created by an unbalance of the vehicle wheel are operatively connected to the spindle shaft and therefore the forces applied during the assembling and disassembling of the tire can act onto the force transducers via the spindle shaft and influence the transducer sensitivity.

BRIEF SUMMARY OF THE INVENTION

It is an object of the invention to provide an apparatus for servicing vehicle wheels including a wheel balancing device and a tire changing device where the forces applied by the tire changer tools do not interfere with the function of the unbalance measuring means.

The problem is solved by an apparatus comprising the features of claim 1. The appendant claims recite advantageous modifications of the invention.

The invention provides an apparatus for servicing vehicle wheels including a wheel balancing device and a tire changing device. The apparatus comprises a spindle shaft which is rotatably supported on a machine frame. The spindle shaft is adapted for mounting and dismounting a tire/rim assembly or a wheel rim of a vehicle wheel on it or from it. Unbalance measuring means are operatively connected to the spindle shaft and the unbalance measuring means have an unbalance measuring direction in which forces created by an unbalance of the tire/rim assembly or by the wheel rim are detected.

Tire changer tools are supported on the machine frame and adapted to assemble a tire onto a rim and to disassemble the tire from the rim, wherein the rim is mounted on the spindle shaft. Spindle supporting means support the spindle shaft on the machine frame with a rigid structure in a force acting range in which forces are created between the respective tire changer tool and the tire during the assembling or the disassembling of the tire onto the wheel rim or from the wheel rim. Tool supporting means support the tire changer tools on the machine frame within said force acting range which is arranged outside of said unbalance measuring direction.

Drive means are designed to drive the spindle shaft within a range of rotational speed and with a torque adapted for assembling and disassembling the tire and for measuring the forces created by an unbalance of the tire/rim assembly or of the wheel rim as well.

The invention provides an apparatus in which the sensitivity of the force transducers which measure the forces created by an unbalance are not influenced, because the force acting range of forces acting during the assembling and disassembling of the tire on the spindle shaft is outside of the spatial unbalance measuring area within which the force transducers are sensitive for the detection of unbalance forces which are considerably smaller than the forces applied by the tire changer tools. Furthermore, the invention provides drive means for the spindle shaft and control means for controlling the drive means to provide a low speed, for instance 5 to 10, especially 7 rpm, and an appropriate torque, for instance 1500 Nm, for the tire assembling and disassembling operation, and a higher speed, for instance 60 to 80 rpm, especially 70 rpm, for the unbalance measurement. The spatial unbalance measuring area can be the measuring direction of at least one force measuring transducer, a plane within which the measuring directions of at least two force transducers are placed, wherein the measuring direction are parallel or angular, especially perpendicular to each other, or a projection of such a plane in an equatorial plane of the tire/rim assembly or of the rim.

According to an embodiment of the invention, the spindle supporting means can include spring elements which are connected with its one ends to the machine frame and with its other ends to a spindle bearing in which the spindle shaft is rotatably supported.

According to another embodiment, the spindle shaft is supported on the machine frame via the force transducers which measure the forces created by an unbalance of the tire/rim assembly or by the wheel rim.

The unbalance measuring direction and the direction of forces created between the tire changer tool and the tire can extend along lines which cross the spindle shaft.

The invention will be explained furthermore by the description of the embodiments which are shown in the drawings.

DETAILED DESCRIPTION OF THE INVENTION

Figure 1:
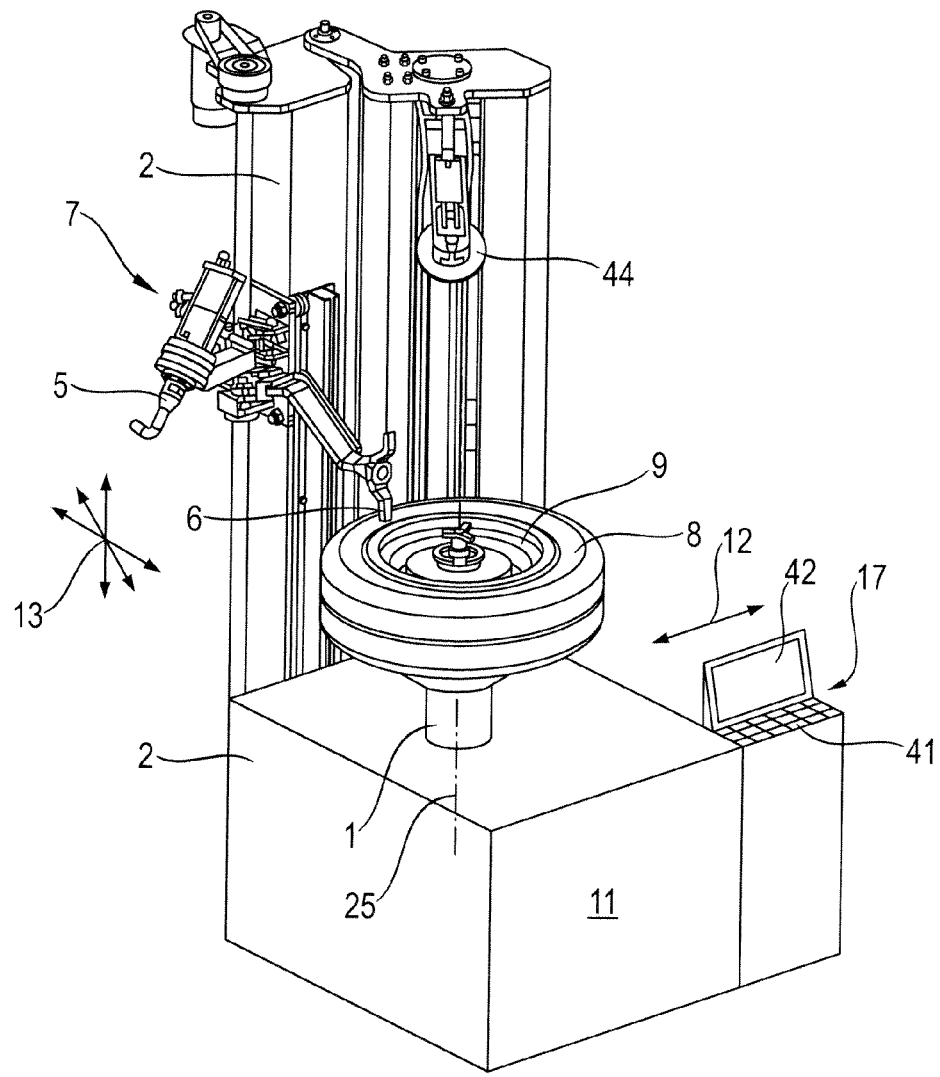
FIG. 1 shows a general view of an inventive embodiment.

The apparatus shown in FIG. 1 includes a tire changing device 7 provided with tire changer tools including mounting/demounting tools 5 and 6 and debeading tools (one debeading tool 44 is shown) which are supported movably on a pillar which is a part of a machine frame 2. The movements of the tire changer tools 5, 6 and 44 are controlled in a known manner during the assembling and disassembling of a tire 8 onto or from a wheel rim 9. The tire changer tools 5, 6 and 44 can be controlled to perform substantially movements perpendicularly and parallel with respect to a shaft axis 25, as will be explained below in conjunction with FIG. 11.

The tire/rim assembly forms a vehicle wheel. The vehicle wheel or the wheel rim 9 can be mounted on a spindle shaft 1 or can be dismounted from the spindle shaft 1. The spindle shaft 1 is rotatably supported in a housing 11 which can be another part of the machine frame 2 or on a part of the machine frame placed within the housing 11. The spindle shaft 1 is supported by spindle supporting means 10 within the housing 11. Appropriate spindle supporting means are shown in the FIGS. 2 to 6 which will be explained below.

Unbalance measuring means which include preferably force transducers 3, 4 (FIGS. 2 to 9) are arranged within the housing 11. The unbalance measuring means are operatively connected to the spindle shaft 1 for detecting forces which are created by an unbalance of the vehicle wheel or of the wheel rim 9. The measuring direction, i.e. the detecting sensitivity of the force transducers 3, 4 is different to or outside of a force acting range within which forces are generated from the tire changer tools 5, 6 and 44 working on the tire 8 during the tire assembling or disassembling process, as will be explained in detail in conjunction with the explanation of the embodiments illustrated in the FIGS. 2 to 9.

Figure 11:
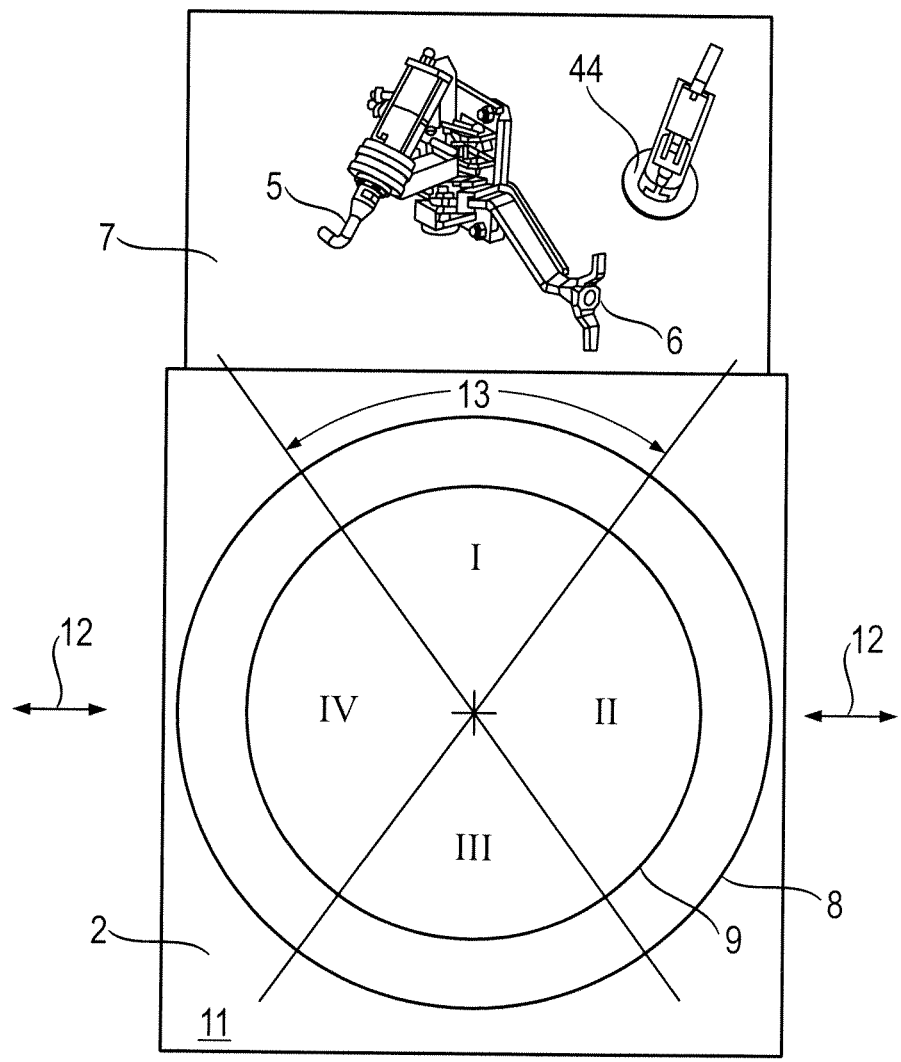
FIG. 11 shows in a schematic plan view the force acting range within the directions of forces created between the tire changer tools and the vehicle wheel extend and the imbalance measuring direction.

The measuring direction of the unbalance measuring means is shown schematically by the arrow 12 and the force acting range of the tire changer tools is shown schematically by the arrows 13 in the FIGS. 1 and 11. The angle between these directions can be 80° to 100°, especially about 90°. The force range of the forces acting during the tire changing produce can include force directions within the angle range of 80° to 100° or larger range. The forces which are applied by the tire changer tools 5, 6 and 44 can extend substantially parallel and perpendicularly with respect to the shaft axis 25, as shown by arrows 13. The schematic plan view illustrates sectors I and III (force acting range) within which directions of forces acting during the tire changing procedure between the tire changing tools 5,6 and 44 and the tire 8 extend. The imbalance measuring direction (arrows 12) extends outside of said force acting range 13 and is positioned within the sectors II and IV.

The apparatus of FIG. 1 may be equipped additionally with a panel 17 including display means 42 and a key set 41. An electric control device according to the block diagram of FIG. 10 can be provided within the panel housing or without the housing 11.

Figure 2:
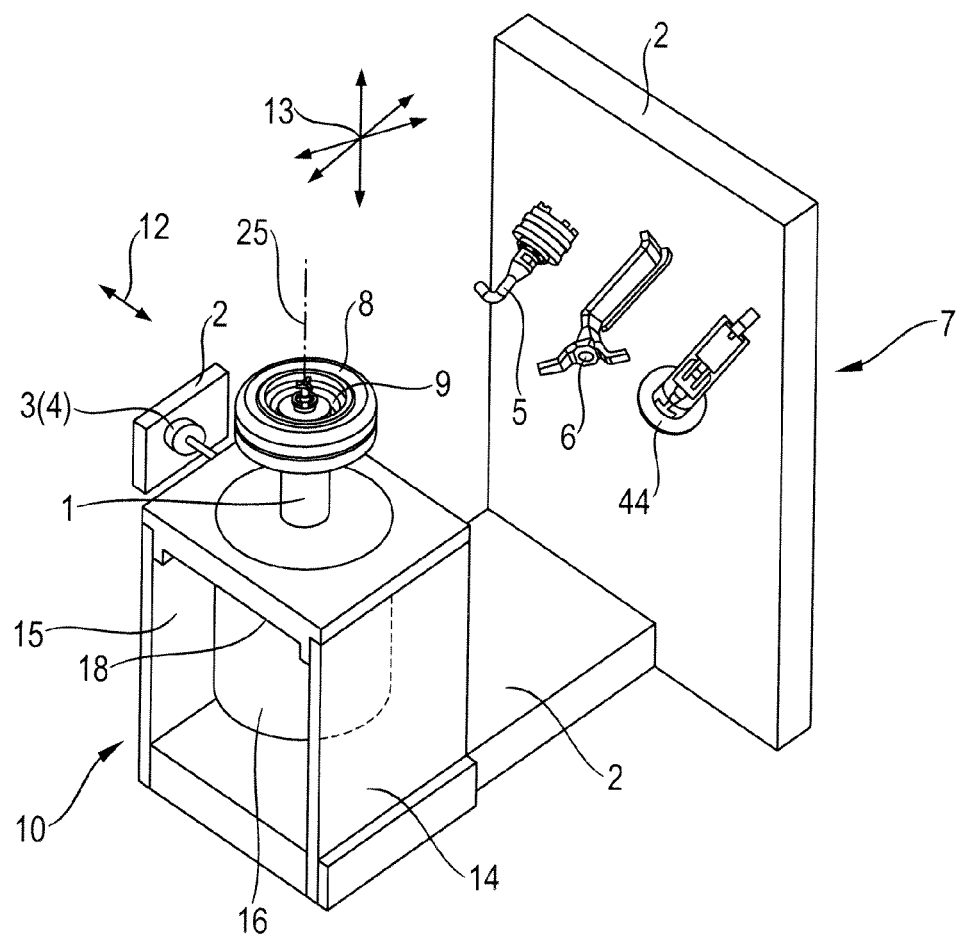
FIGS. 2 to 9 show different embodiments of spindle supporting means which can be used in the inventive apparatus, especially in the embodiment of FIG. 1.

In FIG. 2, the spindle supporting means 10 can include spring elements in form of a pair of flat springs 14, 15 which supports the spindle shaft 1 in a vertical arrangement. That flat springs 14, 15 are arranged parallel to each other and with respect to the shaft axis 25. The lower horizontal ends of the vertically extending flat springs 14, 15 are fixed to the machine frame 2 and the upper horizontal ends of the flat springs 14, 15 are fixed to a spindle bearing 18 which supports rotatably the spindle shaft 1. The spindle shaft 1 is driven by an electric motor 16 which can be fixed to the spindle bearing 18. The electric motor 16 can be driven in controlled manner for performing tire assembling and disassembling or for unbalance measurement, as recited before. One or two force transducers 3, 4 are supported on the machine frame 2 for the detection of forces created by an unbalance of the tire/rim assembly 8, 9 or of the wheel rim 9. The measuring direction (arrow 12) of the force transducer 3(4) extends perpendicularly with respect to the surfaces of the flat springs 14, 15. In the measuring direction of the transducer, the flat springs 14, 15 have elastic properties which allow a force measurement of the transducer 3(4).

In a direction parallel to its surfaces, especially in a horizontal direction, the flat springs 14, 15 have rigid properties. Forces which are applied by the tire changer tools 5, 6 and 44 onto the tire 8 and/or the wheel rim 9 during the tire assembling and disassembling procedure are acting on the spindle shaft 1 and the spindle bearing 18 mainly parallel (arrow 13) to the surfaces of the flat springs 14, 15 and are guided via the flat springs 14, 15 into the machine frame 2 without influencing the force transducer 3(4). The measuring direction (arrows 12) of the transducer 3(4) is outside the force acting range (arrows 13) of the tire changer tools.

Figure 3:
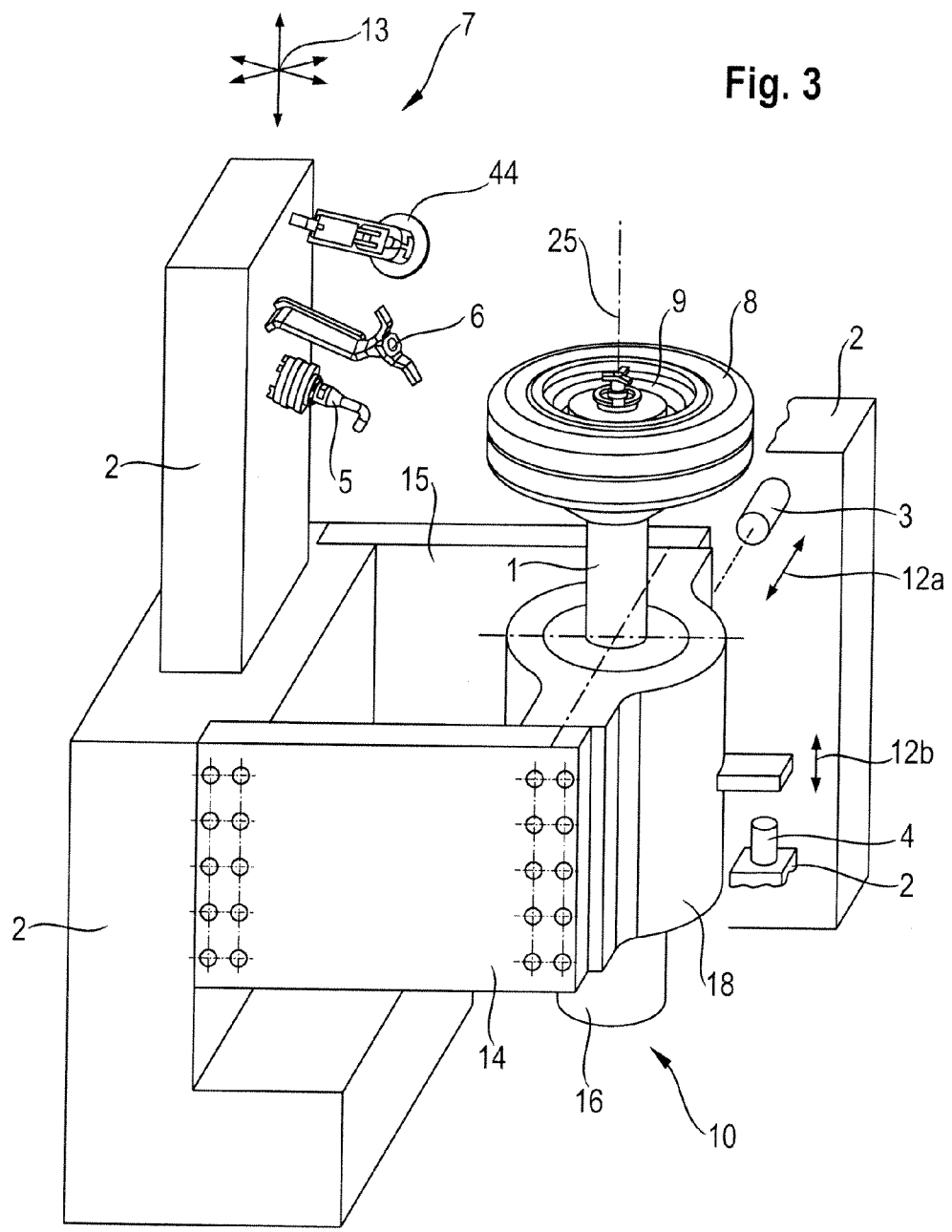
Figure 4:
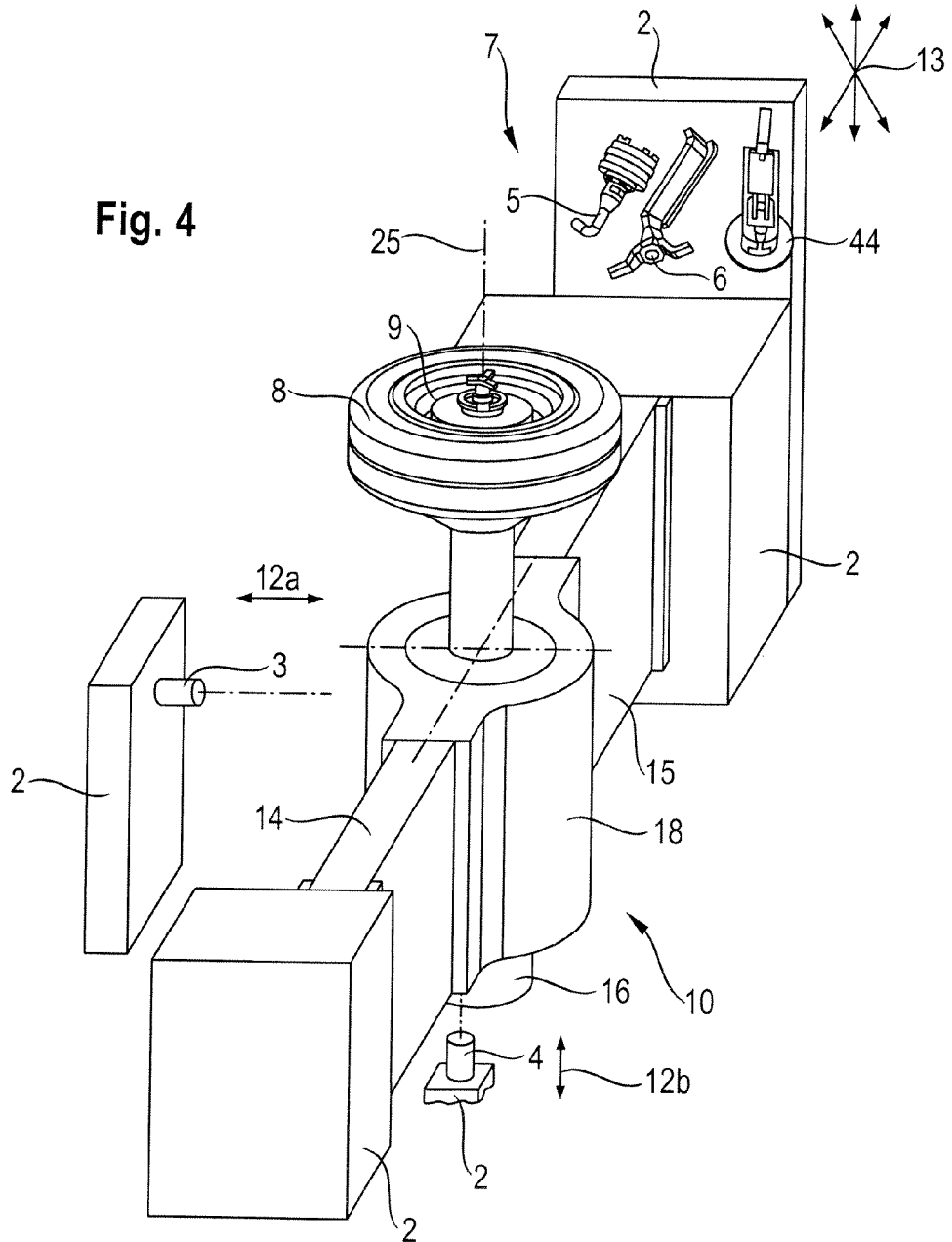
Figure 5:
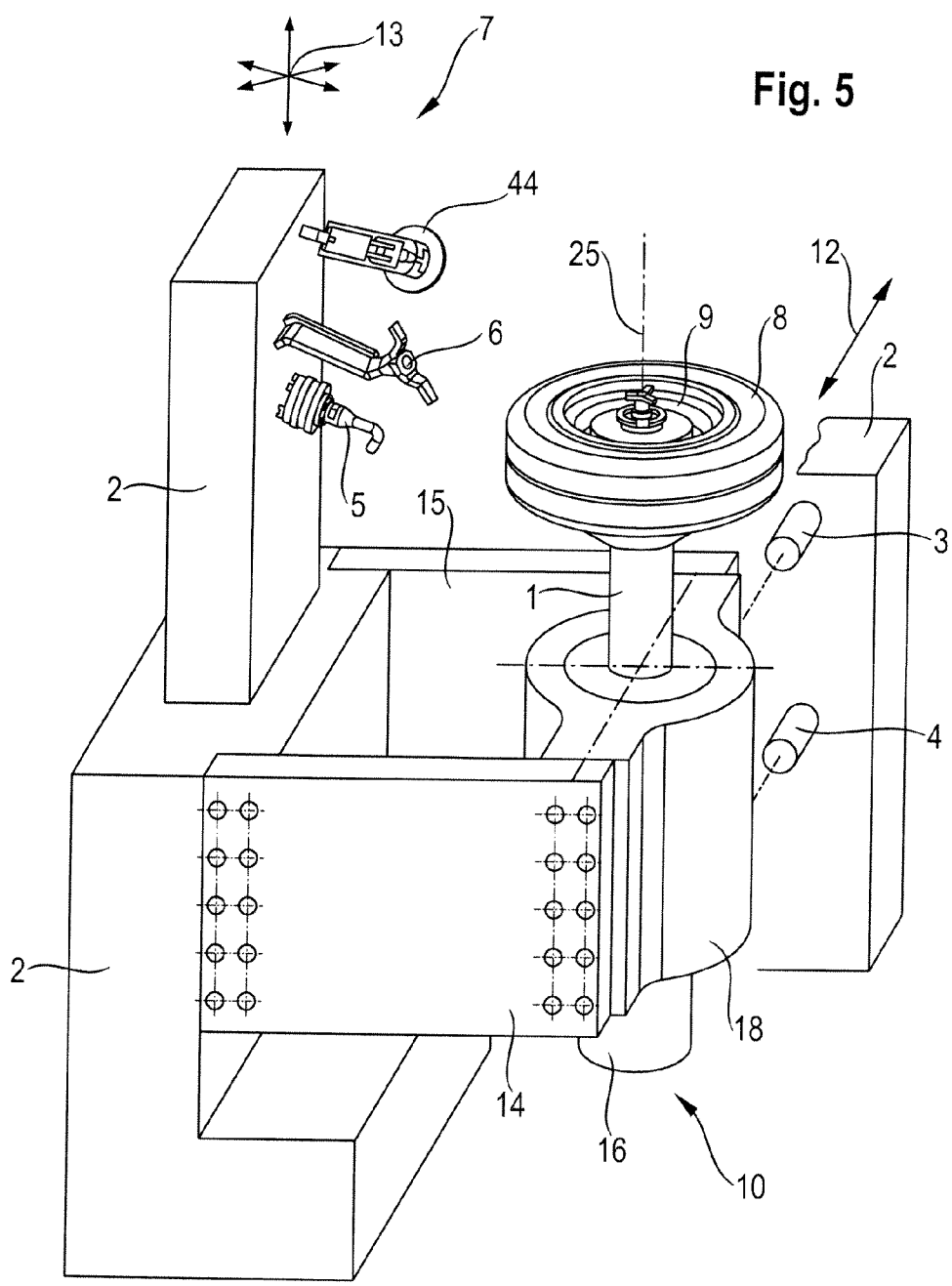
Figure 6:
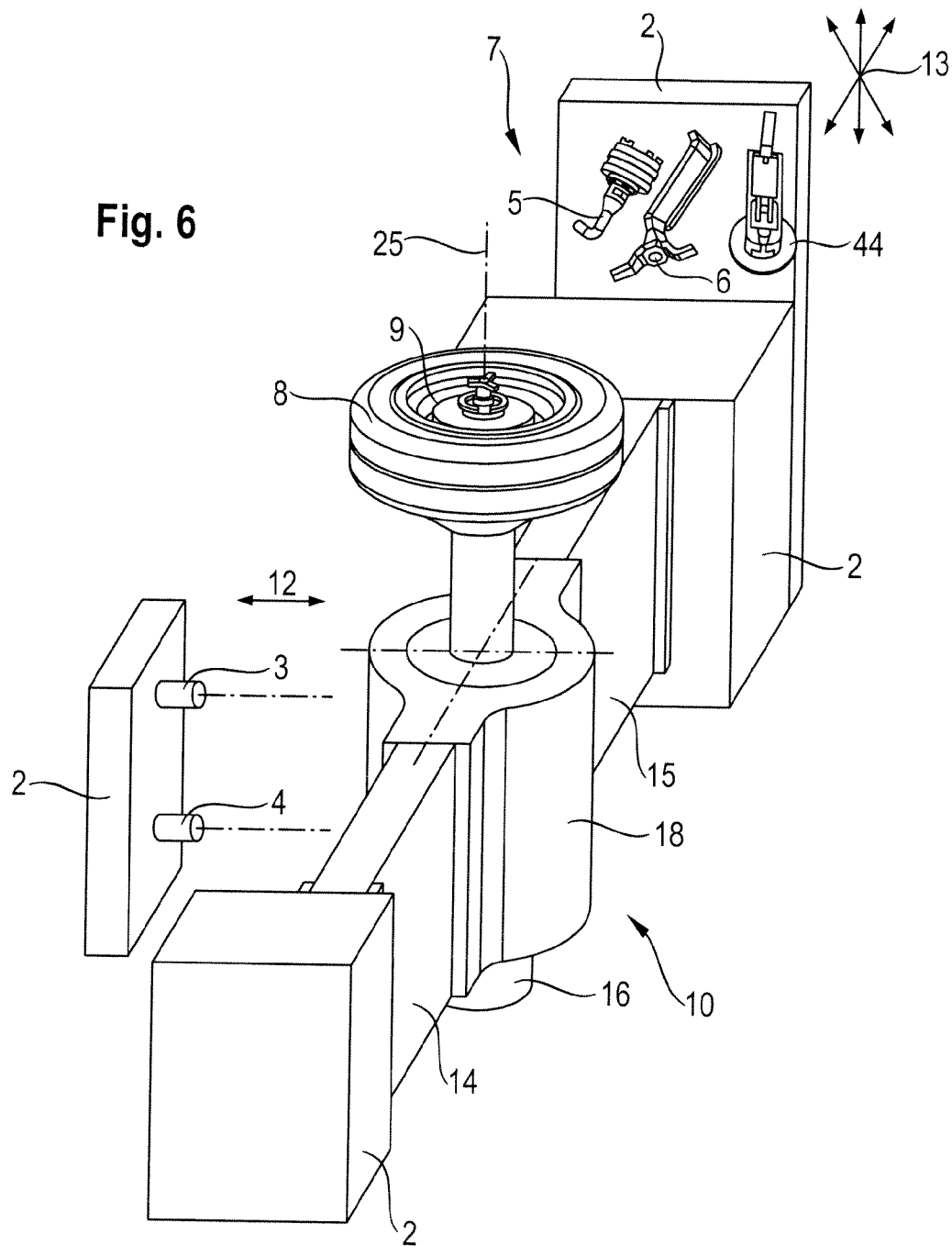

In the embodiments of the FIGS. 3 and 4, the spindle supporting means 10 contain a spindle bearing 18 which constitutes a rotary bearing for the spindle shaft 1 which is driven by the electric motor 16. The spindle bearing 18 is supported by means of plate like spring elements 14, 15 on the machine frame 2. The spindle bearing and the spindle shaft 1 are positioned vertically. The one vertical ends of the spring elements 14, 15 are fixedly connected to the machine frame 2 and the other vertical ends of the spring elements 14, 15 are fixedly connected to the spindle bearing 18. The force transducers 3, 4 are arranged between the machine frame 2 and the spindle bearing 18. The elastic properties of the spring elements 14, 15 permit a force measurement of the force transducer 3, in a horizontal measuring direction (arrow 12a) perpendicular with respect to the shaft axis 25 and a force measurement of the force transducer 4 in a measuring direction substantially parallel to the shaft axis 25 (arrow 12b) during the unbalance measurement. In the embodiment of FIG. 3, the platelike spring elements 14, 15 extend parallel to each other, and in the embodiment of FIG. 4, the platelike spring elements 14, 15 extend in alignment to each other.

The tire changer tools 5, 6 and 44 of the tire changing device 7 can be mounted on the machine frame 2 in the same manner as shown in FIG. 1. The force acting range of the tire changer tools 5, 6 and 44 extends with respect to the spindle axis 25 in an angle range which does not include the measuring directions of the force transducers 3, 4. The arrows 13 illustrated schematically the force acting range of the tire changer tools 5, 6 and 44.

In a direction parallel to its surfaces, especially in a horizontal direction, the flat springs 14, 15 have rigid properties. Forces which are applied by the tire changer tool 5, 6 and 44 onto the tire 8 and/or the wheel rim 9 during the tire assembling and disassembling procedure are acting on the spindle shaft 1 and the spindle bearing 18 mainly parallel (arrows 13) to the surfaces of the platelike springs 14, 15 and are guided via the platelike springs 14, 15 into the machine frame 2 without influencing the force transducers 3, 4. The measuring directions (arrows 12a, 12b) of the transducers 3, 4 are outside the force acting range (arrows 13) of the tire changer tools 5, 6 and 44.

The embodiments illustrated in the FIGS. 1 to 8 show vertical machine types with verticals arranged spindle shafts 1. The vehicle wheel may be mounted on the spindle shaft 1 with the inner wheel side in upward position to facilitate the placement of balancing procedure. It is possible to realize the invention on a horizontal machine type with horizontal spindle shaft as well.

In the embodiments of the FIGS. 2 to 6, the spindle supporting means 10 have platelike or flat spring elements 14, 15 with which the spindle bearing 18 is supported on the machine frame 2. It is possible, however, to use spring elements in the shape of a rectangle frame, wherein respective opposite frame pieces are fixedly connected to the machine frame 2 and to the spindle bearing 18. Such spring elements are known from DE 37 16 210 C2.

Figure 7:
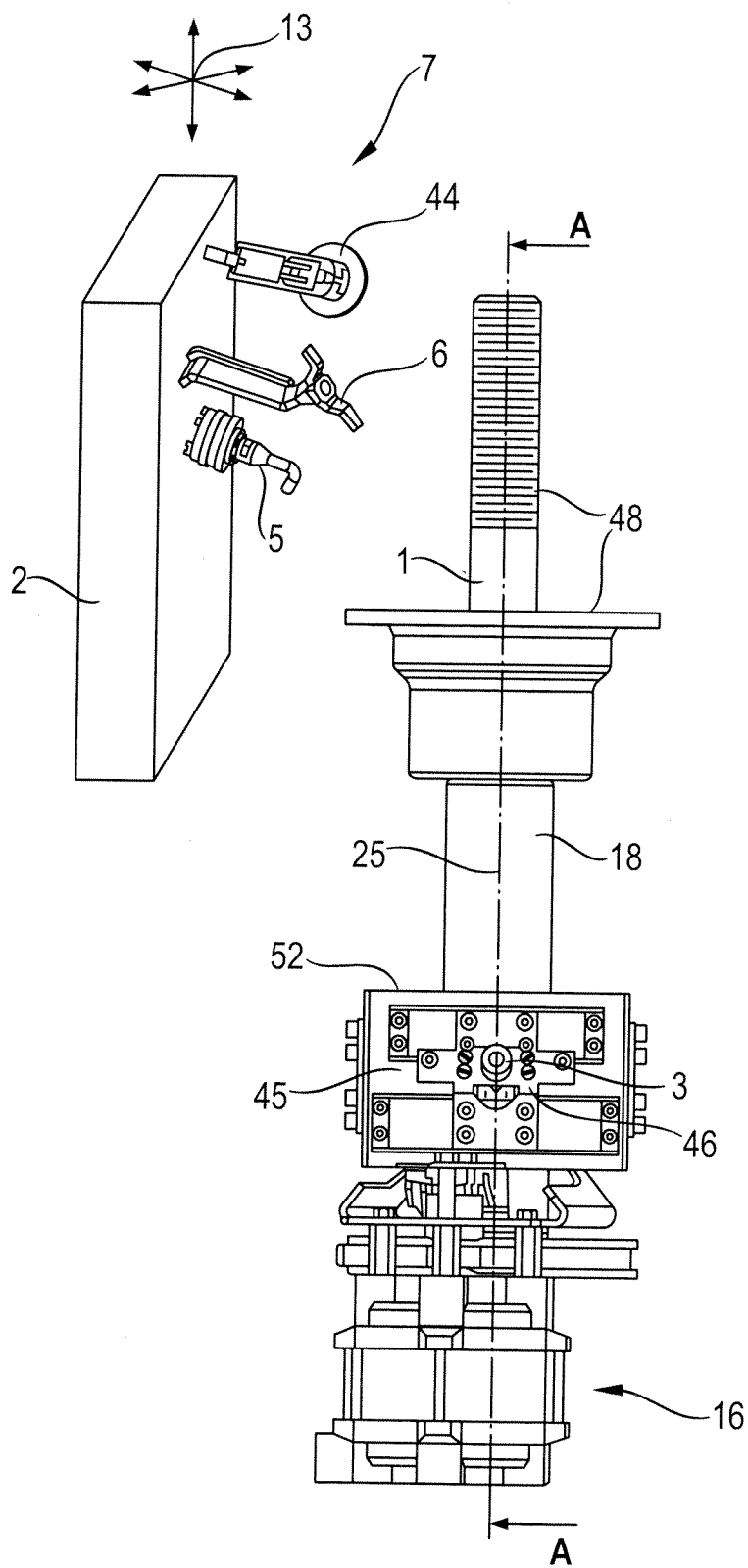

The embodiment shown in the Figures is 7 to 9 includes a measuring device for measuring forces, especially centrifugal forces which are generated by an imbalance of a rotor 9 and the tire changing device 7, which are mounted on the machine frame 2. The Figures show parts of the machine frame 2 or parts which are rigidly connected to the machine frame 2. Those parts are provided with the reference sign "2". The FIG. 8 is a sectional view along the section line A-A in FIG. 7 and FIG. 9 is an explosive view showing the component of the measuring device.

The measuring device comprises a first bearing 4 in form of a tube which establishes the spindle bearing 18 shaft 1 rotatably mounted about its shaft axis 25. For this, the spindle shaft 1 is supported by means of roller bearings 50 within the tube-shaped spindle bearing 18. The spindle shaft 1 has in the region of its free end mounting means 48 which can be designed in known manner for attachment of the rotor, especially the vehicle wheel.

Figure 8:
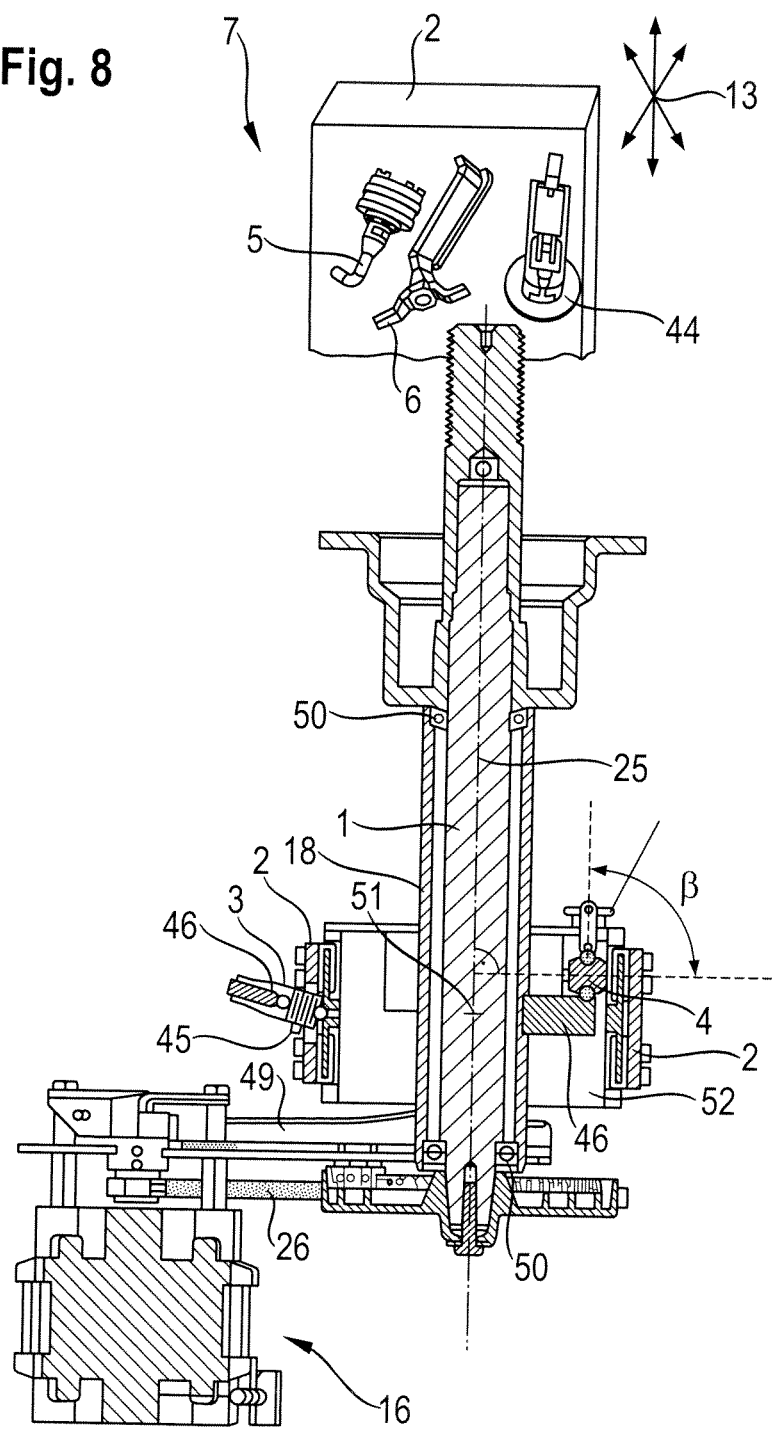
Figure 9:
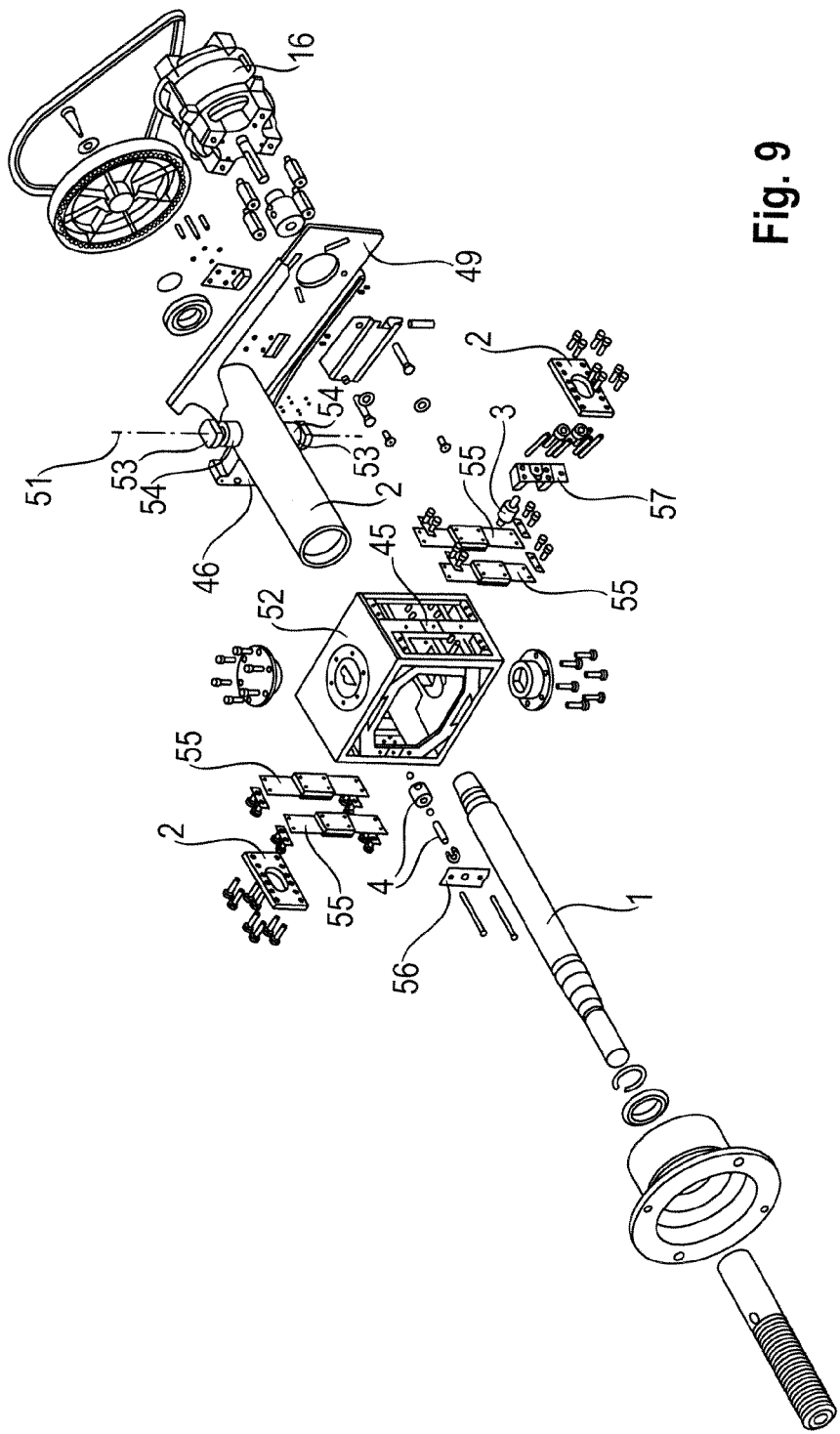

A second bearing 52 for the spindle shaft 1 has a rigid frame structure and supports pivotally the spindle bearing 18 about a pivot axis 51 (FIG. 8). The pivot axis 51 is generated by spring means consisting of two torsion springs 53. The torsion springs 53 are formed on mounting bolts 54 which are rigidly connected to the first spindle bearing 18 and to the second bearing 52. The mounting bolts 54 extend diametrically from the surface of the tubular spindle bearing 2. The one ends (inner ends) of the mounting bolts 54 are connected to the spindle bearing 18 and the other ends (outer ends) of the mounting bolts 54 are connected to the second bearing 52. The torsion springs 53 are established by reduced diameters of the mounting bolts 54 between the inner and the outer ends of the mounting bolts 54. The torsion springs 53 are arranged with respect to the spindle shaft 1 such that the shaft axis 25 extends in the middle between the torsion springs 53 and the pivot axis 51 intersects the shaft axis 25 in a perpendicular angle.

The second bearing 52 is supported on the machine frame 2 in a manner that a force measurement between the spindle shaft 1, particularly the second bearing and the machine frame 2 is possible. For this, the second bearing 52 of the spindle shaft 1 is supported preferably by means of spring means which have the configuration of plate springs 55. The plate springs 55 are placed on both sides of the shaft 1 and extend parallel to each other and perpendicularly with respect to the shaft axis 8. The plate springs on the both sides of the spindle shaft 1 have equal distance from the shaft axis 25. The both ends of the plate spring 55 are rigidly, for instance by means of screw connections, connected to the frame structure of the second bearing 52. The plate springs 55 are rigidly, for instance by means of screw connections, connected in the middle of the extensions to the machine frame 2 or to respective parts of the stationary frame.

The specific arrangement of the spring means 53 and 55 enables that the spindle shaft 1 can perform displacements in two degrees of freedom, namely a rotation about the pivot axis 51 and a translatory motion with respect to the machine frame 2. The directions of the two displacements extend in one plane which passes through the shaft axis 25.

The rotary and translatory displacements of the spindle shaft 1 are measured by force sensors having measuring directions within the one plane in which extend the displacement directions of the spindle shaft 1. The force sensor transducer 4 forces generated by unbalance of the rotating rotor 9 and acting about the pivot axis 12. The other force transducer 3 measures forces generated by the unbalance of the rotating rotor and acting on the spindle shaft 1 and on the second bearing 52 in a direction intersecting the shaft axis 25.

The force transducer 4 is positioned and tensioned between the spindle bearing 18 and the second bearing 52. The measuring direction of the force transducer 4 is inclined with a specific angle β with respect to a direction perpendicular to the shaft axis 25, wherein the angle β is determined in a range from 80° to 100°, preferably from 85° to 95°. In the illustrated embodiment, the angle β is determined to about 90°, namely, in the illustrated embodiment the measuring direction of the force transducer 4 extends parallel to the shaft axis 25. The rotary displacements of the spindle shaft 1 are transmitted by a lever 46 which is rigidly fixed to the tubular spindle bearing 18. The rotary displacement of the spindle shaft 1 is transmitted via the roller bearings 50 which are positioned at the ends of the spindle bearing 18 to the first bearing 2 and via the lever 46 onto the one end of the force transducer 4. For this transmitting movement the lever 46 rotates about the pivot axis 51. The lever 46 extends along the one plane in which the measuring directions of the force transducers 3, 4 lie and extend perpendicularly with respect to the shaft axis 25. The other end of the force transducer 4 is rigidly supported on the second bearing 52 by means of a support plate 22 screwed with the second bearing 52.

The force transducer 3 is at its one end in force transmitting manner connected to a middle side portion 45 of the second bearing 52. The middle side portion 45 extends parallel to the plate springs 55 on the same side of the second bearing 52. The other end of the force transducer 3 is supported on a support bracket 57 which is rigidly connected, preferably by means of screw connections with the machine frame 2 or a respective part of the machine frame. The measuring direction of the force transducer 3 is inclined by a specific angle α with respect to the shaft axis 25. The angle α can be determined in a range from 60° to 120°, for example from 65° to 115°, especially 70° to 110°. In the illustrated embodiment, the angle α is determined to about 75°.

A support member 49 is rigidly connected to the spindle bearing 18. The support member 49 supports the electric motor 16, and a belt drive 26 (FIG. 8) which transmits the motor torque onto the spindle shaft 1.

The measuring directions of the force transducers 3, 4 extends substantially in a plane which goes through the shaft axis 25 of the spindle shaft 1.

The tire changer tools 5, 6 can be arranged in the apparatus as illustrated in FIG. 1 and extends perpendicularly with respect to the drawing plane of the FIG. 7 and parallel to the drawing plane of the FIGS. 7 and 8. The force acting range of the tire changer tools extends outside of the measuring directions of the force transducers 3, 4 and can have around the shaft axis 25 an angle of 80° to 100°, especially 90° with respect to the plane within which the measuring directions of the force transducers 3, 4 are placed.

The drive means for driving the spindle shaft 1 includes the electric motor 16 which can include an integrated gear transmission to provide the respective speed and torque for performing the unbalance measurement and the tire changing process, but the electric motor 16 can apply the torque to the spindle shaft via a separate gear transmission as well. The drive means can include the belt drive 26, as shown in the FIG. 8 for transmitting the torque of the motor 16 to the spindle shaft 1. Furthermore, the power supplied to the electric motor 16 can be controlled to provide the needed torques and speeds for performing the unbalance measurement and the tire changing procedure.

Figure 10:
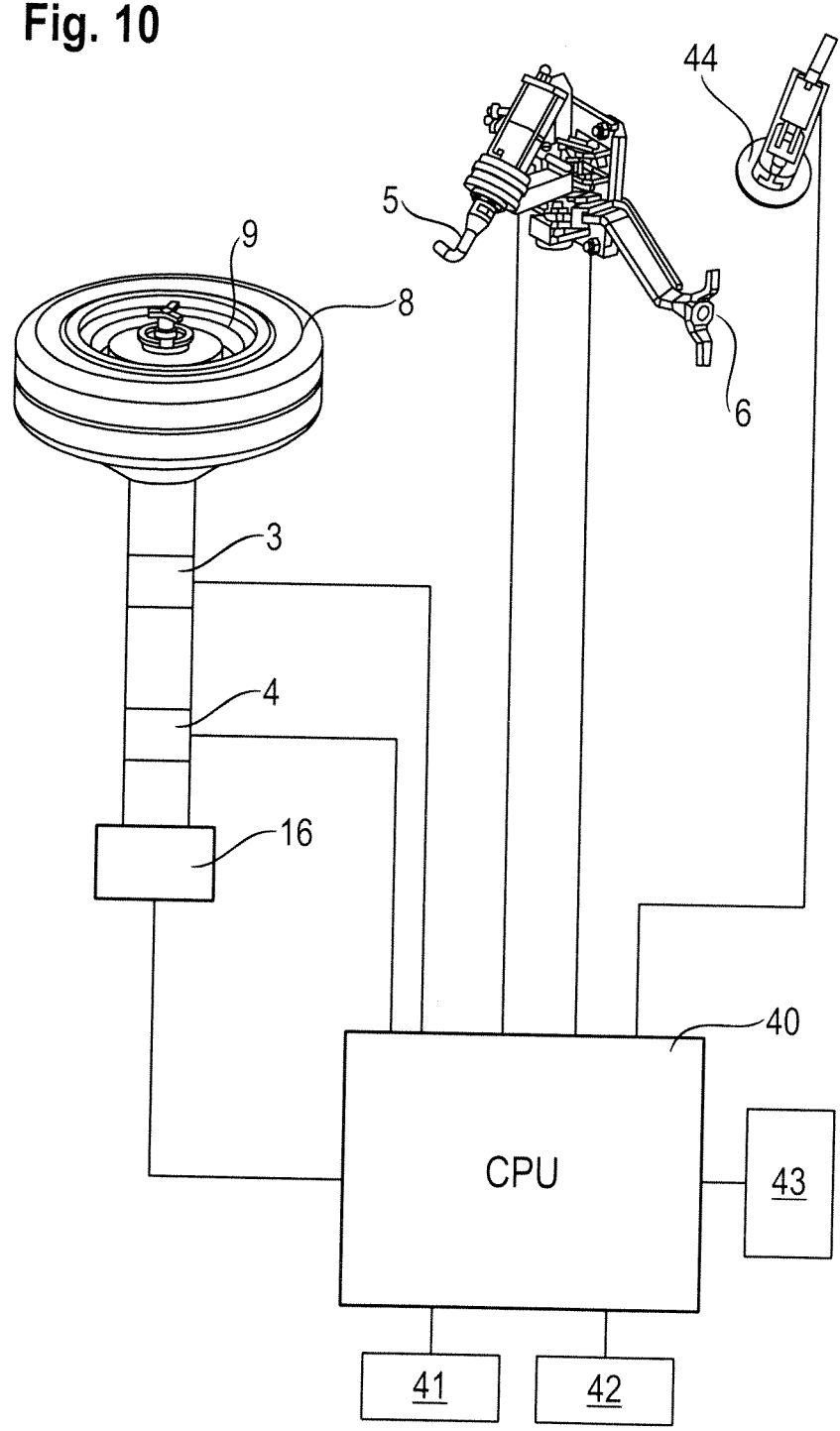
FIG. 10 shows a block diagram of the electric control circuit for controlling the electric motor of the embodiments, and the movement of the tire changer tools.

A block diagram of an electric/electronical device for controlling the electric motor 16 and the movements of the tire changer tools 5, 6 and 44 is shown in FIG. 10. The control device includes a control processing unit 40 which controls the electric current which is delivered to the electric motor 16 from a power source 43 in dependence of the operation which the apparatus of the FIG. 1 should perform. During the tire changing process, the movement and the operation of the respective tire changer tool 5, 6 and 44 is controlled by the control processing unit 40, wherein the needed power is delivered from the power source 43. During the unbalance measurement, the force transducers 3, 4 delivers the measured force data to the control processing unit for the calculation of the balancing weights applied to the vehicle wheel (tire/rim assembly 8, 9). The respective operation of the apparatus can be adjusted by means of the key set 41 connected to the control processing unit 40 and by the display means 42, which are connected as well to the control processing unit 40. The operation can be overviewed and the results of the operations can be illustrated.

LIST OF REFERENCE SIGNS 1 spindle shaft
2 machine frame
3 force transducer
4 force transducer
5 mounting/demounting
6 mounting/demounting
7 tire changing device
8 tire
9 wheel rim
10 spindle supporting means
11 housing
12 unbalance measuring direction
13 force acting range
14 spring element
15 spring element
16 electric motor
17 panel
18 spindle bearing
19 roller bearing
20 roller bearing
21 frame element
22 frame element
23 tensioning member
24 tensioning member
25 shaft axis
26 belt drive
27 intermediate frame
28 support lever
29 support lever
30, 31 flexible end joints
32, 33 flexible end joints
34. support lever
35. support lever
36, 37 flexible end joints
38, 39 flexible end joints
40 central processing unit
41 Key set
42 display means
43 power source
44 debeading tool
45 middle side portion
46 lever
47 support plate
48 mounting means
49 support member
50 roller bearings
51 pivot axis
52 second bearing
53 torsion spring
54 mounting bolts
55 plate springs
56 support plate
57 support bracket

The invention claimed is:

1. Apparatus for servicing vehicle wheels including a wheel balancing device and a tire changing device, wherein
   a spindle shaft is rotatably supported on a machine frame;
   the spindle shaft is adapted for mounting and dismounting a tire/rim assembly or a wheel rim of a vehicle wheel on it or from it;
   unbalance measuring means are operatively connected to the spindle shaft;
   the unbalance measuring means have at least one unbalance measuring direction in which forces created by an unbalance of the tire/rim assembly or by the wheel rim are detected;
   tire changer tools are supported on the machine frame and adapted to assemble a tire onto a rim and to disassemble the tire from the rim, wherein the rim is mounted on the spindle shaft;
   spindle supporting means support the spindle shaft on the machine frame with a rigid structure in a force acting range within which forces are created between the respective tire changer tools and the tire during the assembling or the disassembling of the tire onto the wheel rim or from the wheel rim;
   tool supporting means support the tire changer tools on the machine frame within said force acting range which is arranged outside of a spatial unbalance measuring area within which the measuring directions of the unbalance measuring means extend;
   drive means are designed to drive the spindle shaft within a range of rotational speed and torque adapted for assembling and disassembling the tire or for measuring forces created by an unbalance of the tire/rim assembly or of the wheel rim.

2. The apparatus according to claim 1, wherein the unbalance measuring directions extend within a angle of 80° to 100° with respect to the force acting range of the tire changer tools.

3. The apparatus according to claim 1, wherein a longitudinal axis of the spindle shaft extends within said spatial unbalance measuring area.

4. The apparatus according to claim 1, wherein the spindle supporting means include spring elements connected with their one ends to the machine frame and with their other ends with a spindle bearing in which the spindle shaft is placed rotatably.

5. The apparatus according to claim 1, wherein the spindle supporting means include spring elements and the directions of the forces applied by the tire changer tools extend substantially parallel to the surfaces of the spring elements.

6. The apparatus according to claim 1, wherein the unbalance measuring means has at least one unbalance measuring direction intersecting the shaft axis.

7. The apparatus according to claim 1, wherein the unbalance measuring means has unbalance measuring directions lying on the same plane.

8. The apparatus according to claim 7, wherein the unbalance measuring directions extend substantially parallel or substantially perpendicular to each other.

9. The apparatus according to claim 1, wherein the spindle bearing is pivotally supported about a pivot axis extending perpendicular with respect to the shaft axis on a second bearing which is supported via springs on the machine frame, and wherein one force transducer is placed between the second bearing and the machine frame and another force transducer is placed between the spindle bearing and the second bearing.

10. The apparatus according to claim 1, wherein the surfaces of the fiat spring elements extend parallel to each other and parallel to the shaft axis.

11. Apparatus according to claim 1, wherein the spindle shaft is supported on the machine frame via force transducers which measure the forces created by an unbalance of the tire/rim assembly or by the wheel rim.

* * * * *